United States Patent
Bartholome et al.

(10) Patent No.: US 11,454,429 B2
(45) Date of Patent: Sep. 27, 2022

(54) METHOD AND APPARATUS FOR OPERATING CYCLIC PROCESS-BASED SYSTEMS

(71) Applicant: Fraunhofer-Gesellschaft zur Forderung der Angewandten Forschung E.V., Munich (DE)

(72) Inventors: Kilian Bartholome, Ebringen (DE); Jan Horzella, Ettenheim (DE); Andreas Mahlke, Freiburg (DE); Jan Konig, Freiburg (DE); Marc Vergez, Freiburg (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 484 days.

(21) Appl. No.: 16/061,154

(22) PCT Filed: Dec. 9, 2016

(86) PCT No.: PCT/EP2016/080461
§ 371 (c)(1),
(2) Date: Oct. 16, 2018

(87) PCT Pub. No.: WO2017/097989
PCT Pub. Date: Jun. 15, 2017

(65) Prior Publication Data
US 2019/0032969 A1    Jan. 31, 2019

(30) Foreign Application Priority Data

Dec. 11, 2015  (DE) ...................... 10 2015 121 657.4
Jan. 14, 2016  (DE) ...................... 10 2016 100 596.7

(51) Int. Cl.
*F25B 23/00*  (2006.01)

(52) U.S. Cl.
CPC .......... *F25B 23/00* (2013.01); *F25B 2400/24* (2013.01)

(58) Field of Classification Search
CPC ........................... F25B 23/00; F25B 2400/24
(Continued)

(56) References Cited

U.S. PATENT DOCUMENTS 5,839,290 A   11/1998 Nazeri
6,367,281 B1   4/2002 Hugenroth
(Continued)

FOREIGN PATENT DOCUMENTS

CN     1257338     6/2000
CN     1406330     3/2003
(Continued)

OTHER PUBLICATIONS

Yoon, Youngsam et al., "Hierarchical micro/nano structure for super-hydrophobic surfaces and super-lyophobic surface against liquid metal", Micro and Nano Systems Letters, 18 pages, Jan. 2014.

(Continued)

*Primary Examiner* — Joel M Attey
(74) *Attorney, Agent, or Firm* — Volpe Koenig

(57) ABSTRACT

A method for operating cyclic process-based systems, with a hot-side reservoir (1) and a cold-side reservoir (2) for a fluid (3), and at least one heat exchanger unit (4) with mechanocaloric material, wherein the mechanocaloric material of the heat exchanger unit (4) is actively connected to the fluid (3) such that heat is transferred between the mechanocaloric material and the fluid (3). It is essential that the transfer of heat between the mechanocaloric material and the fluid (3) takes place essentially by latent heat transfer. A corresponding heat-transfer unit (4) and a corresponding apparatus are also provided.

16 Claims, 6 Drawing Sheets

(58) Field of Classification Search
USPC .......................................................... 165/281
See application file for complete search history.

(56) References Cited

U.S. PATENT DOCUMENTS

| | | | |
|---|---|---|---|
| 8,769,946 B2 | 7/2014 | Alexander et al. | |
| 2001/0003347 A1* | 6/2001 | Shimoda | F25D 17/02 |
| | | | 236/13 |
| 2010/0200199 A1 | 8/2010 | Habib et al. | |
| 2012/0273158 A1* | 11/2012 | Cui | F25B 23/00 |
| | | | 165/10 |
| 2014/0182319 A1* | 7/2014 | Hunt | F25B 27/00 |
| | | | 62/238.1 |
| 2014/0338389 A1* | 11/2014 | Ma | F25B 41/04 |
| | | | 62/428 |
| 2015/0075184 A1 | 3/2015 | Edwards et al. | |
| 2016/0084544 A1* | 3/2016 | Radermacher | C09K 5/10 |
| | | | 165/10 |

FOREIGN PATENT DOCUMENTS

| | | |
|---|---|---|
| CN | 102108955 | 6/2011 |
| WO | 0113050 | 2/2001 |

OTHER PUBLICATIONS

Boreyko, Jonathan et al., "Planar jumping-drop thermal diodes", AIP Applied Physics Letters 99, 4 pgs, Jan. 2011.

Li, Xue-Mei et al., "What do we need for a superhydrophoic surface? A review of the recent progress in the preparation of superhydrophobic surfaces", Chemical Society Reviews, 36, pp. 1350-1368, Jan. 2007.

Ohkubo, Yuji et al., "Preparation and characterization of super-hydrophobic and oleophobic surface", Journal of Material Scient, pp. 4963-4969, Feb. 2010.

Feng, Lin et al., A Super-Hydrophobic and Super-Oleophilic Coating Mesh Film for the Separation of Oil and Water, Applied Chemistry, International Edition, pp. 2046-2048, Jan. 2004.

* cited by examiner

METHOD AND APPARATUS FOR OPERATING CYCLIC PROCESS-BASED SYSTEMS

BACKGROUND

The invention relates to a method for operating cyclic-process-based systems, a two heat exchanger unit, and to a device for transporting and/or for converting energy.

Cyclic processes are known from the field of thermodynamics as a sequence of periodic changes in state of a fluid, which pass through an initial state at regular intervals. In the case of cyclic processes, a distinction is made between clockwise processes and counter-clockwise processes. Examples of such cyclic processes are the conversion of heat into work, for example in heat engines, the heating and/or cooling through the use of work, for example in heat pumps.

Here, it is known from the prior art to use mechanocaloric materials in such cyclic processes.

Mechanocaloric materials (also known as shape memory alloys) undergo a crystalline phase transition (change of the crystalline structure) as a result of the application of a mechanical stress, which phase transition gives rise to a change in temperature of the material. This normally involves a crystal lattice conversion between a high-temperature phase (austenite) and a low-temperature phase (martensite). It is equally conversely possible, by a change in temperature of the material, to induce a change in shape and/or volume, for example an expansion or compression, of the material. The crystalline phase transition can thus be effected both by the application of a mechanical stress and also, with the reverse effect, by a change in temperature.

Here, mechanocaloric materials typically exhibit substantially reversible thermal changes in reaction to an applied mechanical stress field. Mechanocaloric materials include elastocaloric materials and barocaloric materials. Elastocaloric materials exhibit mechanocaloric effects in reaction to a change of the uniaxial mechanical stress (also referred to as piezocaloric). Barocaloric materials exhibit a mechanocaloric effect in reaction to an isotropic loading, that is to say changes in hydrostatic pressure.

In the present case, a mechanical stress is to be understood generally to mean a mechanical force, an application of pressure, a tensile or compressive loading, torsion, shear or a corresponding action on the mechanocaloric material.

This above-describe mechanocaloric effect can be used in cyclic-process-based systems, in particular in methods and devices for transporting and/or converting energy by a heat pump and/or a heat engine.

In this regard, it is known from the prior art to use mechanocaloric materials in refrigeration systems for the purposes of transporting heat from a cold side to a hot side via a fluid circuit. Here, the mechanocaloric material is typically arranged as a heat exchanger in a fluid circuit so as to be operatively connected to a hot side and cold side.

For example, US 2012/0273158 A1 presents a refrigeration machine. The refrigeration machine has a hot side and a cold side, wherein heat is transported from the cold side to the hot side. For this purpose, a thermal elastic material is subjected to a mechanical stress. The application of a mechanical stress causes a phase transition to be initiated in the thermal elastic material. The change in temperature that arises during the phase transition warms the hot side. The mechanical stress is subsequently withdrawn, and with the change in temperature that arises as a result of the phase conversion, the cold side is cooled.

A disadvantage of the known devices and methods from the prior art is that the transfer of the heat and thus the transport or the conversion of the energy takes place only with low effectiveness, that is to say with low efficiency.

SUMMARY

It is therefore the object of the present invention to provide a method for operating cyclic-process-based systems, a heat exchanger unit and a device for transporting and/or converting energy, which exhibit increased efficiency in relation to previously known systems.

This object is achieved by a method for operating cyclic-process-based systems, and by a device for transporting and/or converting energy having one or more features of the invention. Preferred refinements of the method according to the invention are described below and in the claims Preferred refinements of the device according to the invention are also described below and in the claims. The wording of all of the claims is hereby explicitly incorporated by reference into the description.

The method according to the invention is preferably configured for being carried out by the device according to the invention and/or by a preferred embodiment of the device. The device according to the invention is preferably designed for carrying out the method according to the invention and/or a preferred embodiment of the method according to the invention.

The method according to the invention for operating cyclic-process-based systems is, in a manner known per se, carried out by a cyclic-process-based system having a hot-side reservoir and a cold-side reservoir for a fluid and at least one heat exchanger unit with mechanocaloric material, wherein the mechanocaloric material of the heat exchanger unit is arranged so as to be operatively connected to the fluid, such that a heat transfer takes place between the mechanocaloric material and the fluid.

It is essential that the heat transfer between mechanocaloric material and fluid takes place substantially by latent heat transfer, that is to say evaporation heat and condensation heat.

The invention is based on the realization by the applicant that the heat transfer from the fluid to the heat exchanger unit comprised of mechanocaloric material by latent heat transfer is particularly effective and thus significantly improve the efficiency of the method. The effectiveness of the heat transport is significantly increased through the realization of the heat transport by latent heat (that is to say evaporation heat and condensation heat).

The method according to the invention therefore differs from previously known methods in major aspects:

In the method according to the invention, the heat transfer from the fluid to the mechanocaloric material of the heat exchanger unit and from the mechanocaloric material to the fluid takes place by the use of latent heat. The fluid condenses on the mechanocaloric material and, in the process, releases heat to the heat exchanger unit, or the condensed fluid evaporates on the heat exchanger unit and, in the process, absorbs heat. This permits highly effective heat transport, approximately two orders of magnitude greater than by the guided transport of liquids for example by pumps. This heat transfer by the use of latent heat also permits a higher frequency between cooling and heating of the calorically active material.

Altogether, this leads to an increase in efficiency in relation to previously known systems.

The heat exchanger unit for a heat pump or a heat engine is formed with mechanocaloric material, wherein the mechanocaloric material is arranged so as to be operatively connected to a fluid, such that heat can be transferred between fluid and mechanocaloric material.

The heat exchanger unit is preferably formed from mechanocaloric material. It however likewise falls within the scope of the invention for, for example, a bracket comprised of any other desired material to be part of the heat exchanger unit. By the heat exchanger unit, heat is transferred from the mechanocaloric material to the fluid and vice versa by indirect or direct thermal contact. According to the invention, the heat transfer between fluid and mechanocaloric material takes place substantially by latent heat transfer, that is to say by evaporation and condensation of the fluid in thermal contact with the mechanocaloric material of the heat exchanger unit.

The device according to the invention for transporting and/or for converting energy comprises, in a manner known per se, a hot-side reservoir and a cold-side reservoir for a fluid, and at least one heat exchanger unit with mechanocaloric material. The mechanocaloric material is arranged so as to be operatively connected to the fluid, such that heat can be transferred between fluid and mechanocaloric material. Furthermore, the device has means for generating a mechanical stress in the mechanocaloric material, such that the mechanocaloric material is arranged in a region of interaction of a mechanical stress field, or means for applying energy from movement, which means are arranged so as to be operatively connected to the mechanocaloric material.

It is essential that the heat transfer between fluid and mechanocaloric material takes place substantially by latent heat.

The device according to the invention likewise has the stated advantages of the method according to the invention. The method according to the invention likewise has all of the stated advantages of the device according to the invention.

As described, the application of a mechanical stress causes mechanocaloric materials to undergo a phase transition, which gives rise to a change in temperature of the material. It is equally conversely possible, by a change in temperature of the material, to induce a change in shape and/or volume, for example an expansion or compression, of the material. The mechanocaloric material can be subjected to a mechanical stress by the means for generating a mechanical stress.

If such mechanocaloric materials are operatively connected to a fluid, the mechanocaloric material warms up when the mechanical stress is applied, and the fluid evaporates and, by latent heat transfer, absorbs evaporation heat from the mechanocaloric material. Accordingly, the heat generated in the mechanocaloric material can be dissipated by the fluid, and the mechanocaloric material cools to ambient temperature. If the mechanical stress field is now withdrawn, the phase transition gives rise to further cooling of the material, such that a correspondingly operatively connected fluid can be cooled and condenses on the mechanocaloric material. The mechanocaloric material absorbs condensation heat from the fluid by latent heat transfer.

The inverse effect likewise falls within the scope of the invention: the mechanocaloric material may cool down when a mechanical stress is applied and warm up when the mechanical stress field is withdrawn. The change in temperature is then correspondingly transferred from and to the fluid by latent heat transfer.

It is conversely also possible for a change in shape and/or volume of the mechanocaloric material to be generated by heating and cooling of the mechanocaloric material by latent heat transfer from or to the fluid.

As mechanocaloric material, use is preferably made of an alloy which exhibits a transition between different crystalline phases, such as for example a nickel-titanium alloy (phase change between austenite and martensite). The following materials are preferably used: Fe68.8Pd31.2, Cu69.6Al27.7Ni2.7, Cu68.1Zn15.8Al16.1, Cu64.6Zn33.7Sn1.7, Fe49Rh51, ZrO2, Ni49.26Mn36.08In14.66, Gd5Si2Ge2, LaFe11.33Co0.47Si1.2.

The pressure loading of the mechanocaloric material lies preferably in the range between 100 and 900 MPa. For example, a change in temperature of over 40° Celsius can be initiated with a pressure loading of ≈500 MPa.

Alternatively, means for applying energy from movement may be arranged so as to be chemically operatively connected to the mechanocaloric material. Here, an application of energy from movement may be any use, conversion or transport of energy.

The movement energy may for example be directly utilized to perform mechanical work. For example, an eccentric could be driven by the movement.

It is however also possible for electrical current to be induced from the movement. This may be realized for example by an oil with a preferably magnetizable core. The magnetizable core of the coil is mechanically operatively connected to the mechanocaloric material. Therefore, a movement of the magnetizable core in the coil is generated by a change in temperature of the mechanocaloric material. An electrical current is induced in the coil by the movement of the core in the coil.

The hot-side reservoir may preferably exhibit temperatures of 10° C.-1000° C., preferably of 50° C.-350° C. The cold-side reservoir may preferably exhibit temperatures of 0° C.-500° C., preferably of 10° C.-200° C. The prevailing pressure preferably lies in the range from 1 mbar-200 bar.

In a preferred embodiment of the method according to the invention, a change in shape and/or volume of the mechanocaloric material is generated by a tensile and/or compressive loading (mechanical stress) of the mechanocaloric material. The tensile and/or compressive loading of the mechanocaloric material causes a change in temperature of the mechanocaloric material to be generated. The device preferably comprises means for tensile and/or compressive loading.

The change in shape is preferably realized by compression of the mechanocaloric material. This can yield the advantage that, in relation to a tensile loading, microcracks in the material cannot propagate as quickly, and the mechanocaloric material thus exhibits a longer lifespan.

Here, the compression of the mechanocaloric material of the heat exchanger unit is preferably performed by a piston system, preferably by at least one cylinder-piston assembly. The mechanocaloric material is in this case arranged in the interior of the cylinder and is compressed by the piston, such that the mechanocaloric material warms up.

The piston and the mechanocaloric material of the at least one heat exchanger unit are preferably connected to one another by a rigid mechanical connection, for example by adhesive bonding, welding or joining.

In a further preferred embodiment of the invention, a transportation of the fluid between hot-side reservoir and heat exchanger unit is controlled by an opening of a hot-side valve between mechanocaloric material of the heat exchanger unit and hot-side reservoir, and a transportation of the fluid between cold-side reservoir and heat exchanger unit is controlled by an opening of a cold-side valve between mechanocaloric material of the heat exchanger unit and cold-side reservoir. The hot-side valve and the cold-side valve are preferably designed as pressure-controlled valves. Use is preferably made of passive overpressure valves which, in a forward direction, open already in the presence of small pressure differences (differential pressure), for example <<10 mbar or <<1 mbar, whereas, in a reverse direction, a fluid flow is blocked. Use may alternatively also be made of actively controlled valves.

This yields the advantage that the fluid flows, preferably in gaseous form, in the fluid circuit already as a result of the opening of the valves, and therefore no guided transport of the fluid is necessary. There is thus no need for pumps. This further increases the efficiency of the heat transport, and also permits a higher frequency between cooling and heating of the mechanocaloric material.

The method is preferably repeated cyclically. Here, by higher frequencies, higher levels of heat pump power can be generated in the case of a heat pump, or higher levels of power can be generated in the case of a heat engine.

In a further preferred embodiment of the invention, the method is suitable for a heat pump having at least two heat exchanger units with mechanocaloric material. The potential energy contained in the compression of the mechanocaloric material of a first heat exchanger unit is preferably used for the compression of the mechanocaloric material of a second heat exchanger unit. It is most preferable for the compression of the two heat exchanger units to take place alternately, preferably with a predefinable alternation frequency. This means that the elastic (potential) energy stored in the material as a result of the compression of the mechanocaloric material is released and used for the compression of the second heat exchanger unit with mechanocaloric material.

This may be realized for example by a mechanical connection of the two heat exchanger units by the mechanocaloric material, analogously to a spring oscillator with two elastic springs and with a weight arranged in between. Accordingly, the system can be set in oscillation, and in every half cycle, a part of the energy is transferred from one heat exchanger unit to the other.

This yields the advantage that the stored potential energy is not lost, but can be utilized for the compression. This increases the efficiency of the method.

In an alternative embodiment of the invention, the device is designed as a heat engine and has a coil with a preferably magnetizable core. The magnetizable core of the coil is coupled to the piston or corresponds to the piston, and is operatively connected to the mechanocaloric material. Therefore, a change in temperature of the mechanocaloric material causes a movement of the magnetizable core in the coil to be generated. The movement of the core in the coil causes an electrical current to be induced in the coil.

Alternatively, the movement of the piston may also be used directly as utilizable mechanical work. It would for example be possible for an eccentric to be driven by the movement.

In a further preferred refinement, the method is suitable for a heat engine having at least two heat exchanger units with mechanocaloric material. The at least two heat exchanger units are each operatively connected to a magnetizable core in a coil. The preferably alternating change in temperature of the two heat exchanger units with mechanocaloric material causes the heat exchanger units to alternately expand, such that the magnetizable core is moved in a coil. This back-and-forth movement causes an electrical current to be induced in the coil.

The heat engine preferably has hot-side valves and cold-side valves, which are preferably opened and closed alternately with respect to one another with an alternation frequency. In each case one heat exchanger unit with mechanocaloric material is assigned a hot-side valve and a cold-side valve. The valves are opened and closed alternately such that the two regions with mechanocaloric material are warmed and cooled in each case alternately. This gives rise to a continuous back-and-forth movement of the magnetizing core in the coil, which induces an alternating current.

In a further preferred embodiment of the invention, the mechanocaloric material of the heat exchanger unit is formed as a porous material, preferably as an open-pored material. This yields the advantage that there is a large surface area available between the mechanocaloric material as heat exchanger unit and the fluid for the transfer of heat, and thus the heat transfer can take place quickly.

According to the invention, not only directed heat transport takes place. The fluid is also, in the method according to the invention and in the device according to the invention, transported continuously from an origin reservoir into the remaining second reservoir. There is thus the risk of the origin reservoir drying out. The device is preferably formed with a fluid circuit for the fluid, and the fluid circuit particularly preferably comprises a fluid return line between hot-side reservoir and cold-side reservoir, such that neither of the two reservoirs dries out.

A fluid return line is advantageous in particular in the case of an implementation as a heat engine. In the case of a heat engine, the fluid is transported from the hot-side reservoir into the cold-side reservoir, such that there is the risk of the hot-side reservoir drying out.

The fluid return line is preferably designed analogously to a liquid return line of a loop heatpipe. In a loop heatpipe, a gas circuit and a liquid circuit are separated from one another. The separation of the liquid region of the fluid from the gaseous region of the fluid is preferably realized by a wick or by a throttle. The fluid return line is preferably designed as a tube filled with a wick. This yields the advantage that, in addition to an efficient return of fluid, a pressure difference between the hot-side reservoir and the cold-side reservoir is also possible. The heat transferred through the fluid return line is negligible, because it is based only on the transmission of sensible heat of the fluid, which is smaller, by several orders of magnitude, than the heat transfer by latent heat.

The fluid return line is preferably realized using tubes of small diameter (capillaries). This is, as described above, already known in the case of the fluid return line in a loop heatpipe. The use of capillaries permits a pressure difference between the two reservoirs, which in known loop heat pipes is used for example for overcoming gravitational forces.

Such a fluid return line therefore also permits a large pressure difference between the hot-side reservoir and the cold-side reservoir, for example in the range from 0.1 to 6 bar. A pressure equalization via the fluid return line does not take place, because this pressure equalization is prevented by the capillary forces. Depending on the pressure difference to be overcome, the diameter or the number of capillaries is selected correspondingly, analogously to the design in the case of the loop heatpipe.

The diameters preferably lie in the range from a few nanometers up to several hundred micrometers. The diameter of the capillaries is in this case selected in a manner dependent on the pressure difference to be overcome between hot-side reservoir and cold-side reservoir. For example, it has already long been known from the prior art, see for example U.S. Pat. No. 5,839,290 A or US 2010/0200199 A1, to produce capillaries with diameters in the nanometer range. Multiple capillaries may be connected in parallel in order to overcome large pressure differences.

The fluid return line is preferably connected to the origin reservoir, in particular to the hot-side reservoir, such that there is a large interaction surface area at the inside of the origin reservoir. This, in a simple manner, permits an adequate return transport of the fluid in order to permit an equilibrium state between evaporation and return of the fluid in continuous operation.

Alternatively, the fluid return line, in particular in the case of a heat pump, may also be designed as a simple throttle, analogously to classic compressor systems, such as our used nowadays in refrigeration installations and heat pumps.

Alternatively, the fluid return line, in particular in the case of a heat engine, may be designed as an active pump, which pumps the fluid from the hot-side reservoir back into the cold-side reservoir.

Here, the fluid circuit with hot-side reservoir, cold-side reservoir, hot-side valve, called-side valve, mechanical or material and the fluid return line is preferably designed as a pressure-tight (gas-tight) system. Here, the pressure-tight system is designed such that the heat transfer from the fluid to the mechanocaloric material takes place by latent heat, by virtue of substantially all foreign gases (that is to say all gases with the exception of the fluid) having been removed from the pressure-tight system. It is ensured in this way that, by evaporation and condensation of the fluid, the heat is transmitted very efficiently by latent heat transfer, because no diffusion processes take place in the pressure-tight system. The heat transport in the pressure-tight system thus takes place analogously to the heat transport in a heat pipe. If, by contrast, foreign gases are still present at a significant level in the pressure-tight system, then a diffusion process must also take place in addition to the evaporation and condensation process, which diffusion process is generally considerably slower.

In an alternative embodiment of the invention, the cold-side reservoir, hot-side reservoir and mechanocaloric material (heat exchanger unit) are arranged in a common closed-off volume. This means that only the heat exchanger unit, and no further physical separation, is present between cold-side reservoir and hot-side reservoir. The cold-side reservoir is arranged in a region of the volume, and the hot-side reservoir is preferably arranged in an oppositely situated region of the volume. The mechanocaloric material of the heat exchanger unit is arranged between said regions.

As described above, according to the invention, not only directed heat transport takes place. The fluid is also transported continuously from an origin reservoir into the remaining, other reservoir. There is thus the risk of the origin reservoir drying out. The volume is preferably designed such that the heat transport takes place by convection of the evaporated fluid, and a return transport of the condensed fluid (fluid return) takes place in order to prevent the origin reservoir drying out.

In a preferred embodiment of the invention, the closed-off volume has a fluid-phobic coating and/or structuring at the inside on the region of the other reservoir, preferably of the hot-side reservoir, and/or a fluid-philic coating and/or structuring on and/or in the region of the origin reservoir, preferably of the cold-side reservoir.

In the context of this description, a fluid-phobic coating and/or structuring means that the surface is coated and/or structured such that the fluid used is repelled by the surface. This encompasses hydrophobic, superhydrophobic, oleophobic and also other coatings and/or structurings which repel a fluid other than water or oil. The term lyophobic is in some cases also used in the literature to describe fluid-phobic coatings and/or structurings, see for example Y. Yoon, D. Kim and J.-B. Lee, Micro and Nano Systems Letters 2014, 2(1), 1-18.

In the context of this description, a fluid-philic coating and/or structuring means that the surface is coated and/or structured such that the fluid used interacts intensely with the surface. This encompasses hydrophilic, superhydrophilic, oleophilic and also other coatings and/or structurings which interact intensely with fluid other than water or oil. The term lyophilic is in some cases also used in the literature to describe fluid-philic coatings and/or structurings, see for example Y. Yoon, D. Kim and J.-B. Lee, Micro and Nano Systems Letters 2014, 2(1), 1-18.

The closed-off volume may thus be formed with a fluid-phobic coating and/or structuring in the region of the hot-side reservoir, and formed without a coating and/or structuring in the region of the cold-side reservoir. Alternatively, the closed-off volume may be formed with a fluid-philic coating and/or structuring in the region of the cold-side reservoir, and formed without a particular coating and/or structuring in the region of the hot-side reservoir.

It likewise falls within the scope of the invention for the closed-off volume to be designed with a fluid-phobic coating and/or structuring in the region of the hot-side reservoir and with a fluid-philic coating and/or structuring in the region of the cold-side reservoir.

The described variants of the coating and/or structuring lead to a fluid circuit of a "jumping-drop thermal diode", as described in Boreyko et al., Applied Physics Letter 99 for hydrophobic and hydrophilic coatings. If the fluid in the closed-off volume evaporates and condenses on the fluid-phobic coating in the region of the other reservoir, the condensed droplets of the fluid are correspondingly repelled by the coating, such that these "jump back" into the fluid-philic region of the origin reservoir. The jumping-drop thermal diode functions independently of the position of the diode in space. Furthermore, the advantage is achieved that the return transport of the condensed fluid can take place quickly.

It is also possible for a hydrophilic and/or hydrophobic structuring as in X.-M. Li, D. Reinhoudt and M. Crego-Calama, Chemical Society Reviews, 2007, 36(8), 1350-1368 to be provided.

The closed-off volume preferably has a superhydrophobic coating in the region of the cold-side reservoir and a superhydrophilic coating in the region of the hot-side reservoir. The device is thus preferably designed as a "jumping-drop thermal diode", with a coating or structuring of the respective surface as described in Boreyko et al., Applied Physics Letter 99. In this case, as fluid, use is preferably made of water or a water-based fluid. If the fluid in the closed-off volume evaporates and condenses on the superhydrophobic coating, the condensed droplets of the fluid are correspondingly repelled by the coating, such that these "jump back" into the superhydrophilic region. The jumping-drop thermal diode functions independently of the position of the diode in space. Furthermore, the advantage is achieved that the return transport of the condensed fluid can take place quickly.

Alternatively, the closed-off volume has an oleophilic coating and/or structuring in the region of the hot-side reservoir and/or an oleophobic coating and/or structuring in the region of the cold-side reservoir. In this case, as fluid, use is preferably made of oil or an oil-based fluid.

The oleophilic coating and/or structuring and/or the oleophobic coating and/or structuring our preferably configured as described in Y. Ohkubo, I. Tsuji, S. Onishi and K. Ogawa, Journal of materials science, 2010, 45(18), 4963-4969 and also L. Feng, Z. Zhang, Z. Mai, Y. Ma, B. Liu, L. Jiang and D. Zhu, Angewandte Chemie [Applied Chemistry] International Edition, 2004, 43(15), 2012-2014.

In a further alternative embodiment, the return transport takes place by gravitational force, by virtue of the condensed fluid condensing on a surface and running back into the origin region owing to the gravitational force. This process is however rather slow and is not independent of position.

In both embodiments, the closed-off volume is designed as a thermal diode, which restricts the heat flow to one direction.

In a further preferred embodiment of the invention, the device is designed as a heat pump and, as means for generating a mechanical stress in the mechanocaloric material, has means for tensile and/or compressive loading, in particular a piston system, preferably a cylinder-piston assembly. The mechanocaloric material is in this case arranged in the interior of the cylinder and is compressed by the piston.

The device preferably comprises at least two heat transfer units with mechanocaloric material, which are arranged in two different cylinders. The means for generating a mechanical stress in the mechanocaloric material are preferably arranged and designed so as to interact with the two heat exchanger units such that the two heat exchanger units can be subjected to loading alternately. For this purpose, it is preferable for the at least two heat exchanger units with mechanocaloric material to each be arranged in a cylinder which is closed off on one side, wherein, centrally, there is arranged a piston for the alternating compression of the mechanocaloric material. Here, the potential energy of the compressed one heat exchanger unit with mechanocaloric material is used for the compression of the mechanocaloric material in the second cylinder.

The device is preferably formed with an eccentric, most preferably with a common-rail pump, in particular for the tensile and/or compressive loading of the mechanocaloric material.

The eccentric is optionally alternatively formed with a ball bearing, the central point of which lies outside the shaft axis of the eccentric shaft. The ball bearing is indirectly operatively connected, in the present case in non-positively locking fashion, to preferably two heat exchanger units. In the event of a rotation of the shaft, the ball bearing rotates and compresses the two heat exchanger units in each case alternately. Here, the compression takes place within the gas-tight volume of the cylinders that surround the mechanocaloric material. Here, the ball bearing may be situated outside the cylinder and act on the heat exchanger units through the cylinder, for example via a bellows.

In an alternative refinement of the invention, the device is designed as a heat pump and has a coil with a preferably magnetizable core. An electrical energization of the coil causes a movement of the core in the coil. The core is preferably coupled to, or corresponds to, the piston for the compression of the mechanocaloric material. The movement of the magnetizable core in the coil therefore causes a compression of the mechanocaloric material, such that a change in temperature of the mechanocaloric material is generated.

In this case, too, the device preferably comprises at least two heat exchanger units with mechanocaloric material, which are arranged in two different cylinders. The coil with the magnetizable core as means for generating a mechanical stress in the mechanocaloric material is preferably arranged and designed so as to interact with the two heat exchanger units such that the two heat exchanger units can be subjected to loading alternately. For this purpose, the at least two heat exchanger units with mechanocaloric material are each arranged in a cylinder which is closed off on one side, wherein, centrally, the magnetizable core is arranged as a piston for the alternating compression of the mechanocaloric material. Here, the potential energy of the compressed one heat exchanger unit with mechanocaloric material is preferably used for the compression of the mechanocaloric material in the second cylinder.

The mechanocaloric material of the heat exchanger unit is preferably formed with a honeycomb structure, as a pin structure or as a spring. In the case of the honeycomb structure, there is the advantage that the acting forces of the mechanical stress field are distributed homogeneously in the honeycomb structure. This ensures a uniform force distribution despite thin structures, and a long lifetime of the mechanocaloric material. In the case of the embodiment as a pin structure, there is the advantage that a stable structure can be formed in a simple manner. In the case of the embodiment as a spring, there is the advantage that a spring structure permits a greater travel owing to the compression of the mechanocaloric material by a piston system. Here, in a particularly efficient manner, the potential energy stored in the mechanocaloric material is returned in order that it can be utilized for a compression of a further heat exchanger unit with mechanocaloric material.

The mechanocaloric material preferably has a structuring and/or coating, preferably a nanostructuring and/or a hydrophilic coating. This permits homogeneous wetting and a good distribution of the fluid.

In a preferred embodiment, the method is provided for operating a heat pump. In this embodiment, the method is implemented by a heat pump with pressure-controlled valves, and preferably follows the following sequence:

A Compression of the mechanocaloric material of the heat exchanger unit.

The compression gives rise to a phase transition in the mechanocaloric material, and the temperature of the mechanocaloric material increases.

B Heat transfer from the mechanocaloric material to the fluid by latent heat (evaporation heat).

The surrounding fluid warms up and evaporates. As a result, the pressure in the region of the heat exchanger unit increases.

C Opening of the hot-side valve.

Above a certain pressure (differential pressure), the hot-side valve, which controls the connection to the hot-side reservoir, opens. The fluid flows into the hot-side reservoir and, here, releases the stored heat.

This leads to a temperature equalization between mechanocaloric material and hot-side reservoir.

D The compression pressure on the mechanocaloric material of the heat exchanger unit is withdrawn.

As a result of the phase transition, the mechanocaloric material cools down.

E Heat transfer from the fluid to the mechanocaloric material by latent heat (condensation heat).

The substantially vaporous fluid condenses on the mechanocaloric material, such that here, a heat transfer takes place from the fluid to the mechanocaloric material by latent heat.

F Opening of the cold-side valve.

As a result of the condensation of the fluid, the pressure in the region of the heat exchanger unit decreases, and thus the cold-side valve, which controls the connection to the cold-side reservoir, opens.

Fluid then evaporates out of the cold-side reservoir and flows to the mechanocaloric heat exchanger.

This results in a temperature equalization between mechanocaloric heat exchanger and cold-side reservoir.

By this embodiment of the method according to the invention, it is thus possible, by cyclic operation, for heat to be transported from the cold-side reservoir to the hot-side reservoir.

In an alternative embodiment, the method is provided for operating a heat engine. In this embodiment, the method is implemented by a heat engine for generating electrical current having actively controlled valves, and preferably follows the following sequence:

A Opening of the hot-side valve.

The fluid flows from the hot-side reservoir into the region of the heat exchanger unit with the mechanocaloric material.

B Heat transfer from the fluid to the mechanocaloric material by latent heat (condensation heat);

The substantially vaporous fluid condenses on the mechanocaloric material, such that, here, a heat transfer by latent heat takes place, and the mechanocaloric material warms up.

The change in temperature give rise to a change in volume and/or shape of the mechanocaloric material of the heat exchanger unit.

C Movement of the piston, which is arranged as a magnetizable core in the coil and which is operatively connected to the mechanocaloric material.

In the event of a change in volume and/or shape of the mechanocaloric material, the piston is moved and is pushed out of the cylinder that surrounds the mechanocaloric material.

D Induction of a current in the coil.

The movement of the magnetizable core in the coil causes an electrical current to be induced in the coil.

E Opening of the cold-side valve.

As a result of an opening of the cold-side valve, the pressure in the region of the heat exchanger unit decreases, and the fluid evaporates and flows into the cold-side reservoir. But F Heat transfer from the mechanocaloric material to the fluid by latent heat (evaporation heat).

Here, a heat transfer from the mechanocaloric material to the fluid takes place by the evaporation heat. A further change in volume and/or shape of the mechanocaloric material occurs.

G Movement of the piston and the opposite direction.

In the event of a change in volume and/or shape of the mechanocaloric material, the piston is moved and is pulled into the cylinder that surrounds the mechanocaloric material.

D Induction of a current in the coil.

The movement of the magnetizable core in the coil causes an electrical current to be induced in the coil.

The method may be repeated starting with method step A.

By this embodiment of the method according to the invention, it is thus possible for electrical current to be generated from the heat of the hot-side reservoir.

The method according to the invention and the device according to the invention are basically suitable for applications in which it is sought to perform a conversion of heat into work or electrical current, or to perform heating and/or cooling through the use of work.

The method according to the invention and the device according to the invention are therefore preferably designed as heat engines and/or heat pumps or are used in heat engines and/or heat pumps. A use as an actuator is alternatively also possible.

BRIEF DESCRIPTION OF THE DRAWINGS

Further preferred features and embodiments of the method according to the invention and of the device according to the invention will be discussed below on the basis of exemplary embodiments and the figures, in which.

DETAILED DESCRIPTION

In FIGS. 1 to 6C, the same reference designations are used to denote identical elements or elements of identical action.

Figure 1:
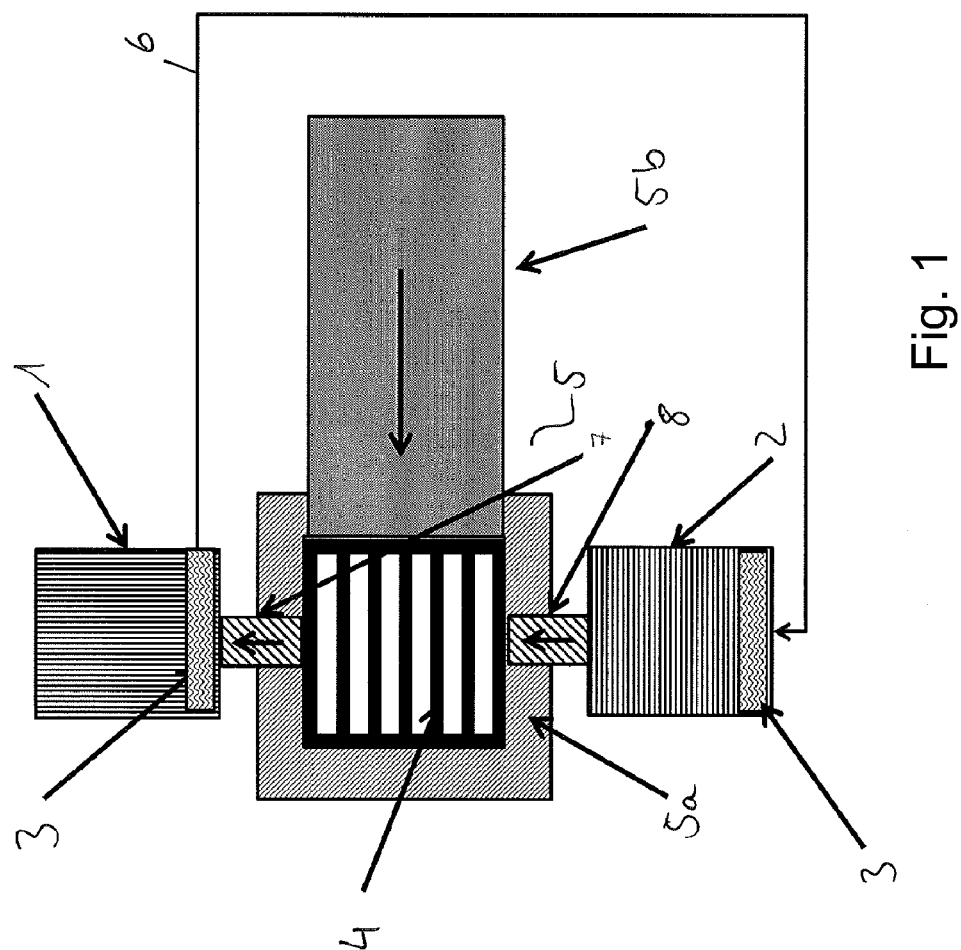
FIG. 1 is a schematic illustration of a first exemplary embodiment of a device according to the invention as a heat pump.

FIG. 1 is a schematic illustration of a heat pump as a first exemplary embodiment of a device according to the invention.

In the present case, the device is designed as a heat pump and is designed with a hot-side reservoir 1 and a cold-side reservoir 2 for a fluid 3. In the present case, water is used as fluid 3. In the present case, the hot-side reservoir 1 has a temperature of 150° C. and a prevailing pressure of 4.7 bar. In the present case, the cold-side reservoir 1 has a temperature of 20° C. and a prevailing pressure of 0.023 bar.

A heat exchanger unit 4 with mechanocaloric material is arranged between hot-side reservoir 1 and cold-side reservoir 2. In the present case, the mechanocaloric material 4 is a nickel-titanium alloy.

In the present case, the heat pump has a fluid circuit for the fluid 3. For this purpose, a fluid return line 6 is arranged between hot-side reservoir 1 and cold-side reservoir 2. The fluid circuit thus comprises hot-side reservoir 1, cold-side reservoir 2, hot-side valve, cold-side valve, the region of the heat exchanger unit 4, and the fluid return line 6. The fluid circuit is designed as a pressure-tight system by virtue of substantially all foreign gases (that is to say all gases with the exception of the fluid 3) having been removed from the pressure-tight system.

In the fluid circuit, a hot-side valve 7 is arranged between the region of the heat exchanger unit 4 and the hot-side reservoir 1, and a cold-side valve 8 is arranged between the region of the heat exchanger unit 4 and the cold-side reservoir 2. In the present case, the hot-side valve 7 and the cold-side valve 8 are designed as pressure-controlled valves. The respective differential pressure at which the two valves open is adjustable, and in the present case is 10 mbar.

In the present case, as means for generating a mechanical stress in the mechanocaloric material, the heat pump has means for exerting tensile or compressive loading on the mechanocaloric material by a piston system 5. The piston system 5 comprises a cylinder 5a, in which the mechanocaloric material 4 is arranged, and a piston 5b, and is in the present case designed with an eccentric for compressing the mechanocaloric material. The maximum exertion of pressure is in the present case 500 MPa.

The mechanocaloric material of the heat exchanger unit 4 is arranged so as to be operatively connected to the fluid 3, such that heat can be transferred between fluid 3 and mechanocaloric material. For this purpose, the fluid flows through the mechanocaloric material of the heat exchanger unit 4. The pressure-type system is, by the temperature of the hot-side reservoir 1, the temperature of the cold-side reservoir 2 and the prevailing pressure of the fluid 3, designed such that the heat transfer from the fluid 3 to the mechanocaloric material of the heat exchanger unit 4 takes place by latent heat.

During the operation of the heat pump, the following method steps are performed repeatedly:

A Compression of the mechanocaloric material of the heat exchanger unit 4 by the piston system 5.

The piston 5b is moved into the cylinder 5a by the eccentric. As a result, the mechanocaloric material of the heat exchanger unit 4 is compressed. The compression gives rise to a phase transition in the mechanocaloric material, and the temperature of the mechanocaloric material increases.

B Heat transfer from the mechanocaloric material to the fluid 3 by latent heat (evaporation heat).

The surrounding fluid 3 warms up as a result of the contact with the mechanocaloric material of the heat exchanger unit 4, and evaporates. As a result, the pressure in the region of the heat exchanger unit 4 increases.

C Opening of the hot-side valve 7.

If the pressure in the region of the heat exchanger unit 4 exceeds the differential pressure of the hot-side valve, the hot-side valve 7, which controls the connection to the hot-side reservoir 1, opens. The gaseous fluid 3 flows into the hot-side reservoir 1 and, here, releases the stored heat.

Active control of the valves may alternatively also be performed.

As a result of the heat transfer to the fluid 3, the mechanocaloric material has assumed the ambient temperature.

D The compression pressure on the mechanocaloric material of the heat exchanger unit 4 is withdrawn.

The piston 5b is moved out of the cylinder 5a by the eccentric. This gives rise to the reverse phase transition in the mechanocaloric material, and the temperature of the mechanocaloric material decreases.

E Heat transfer from the fluid 3 to the mechanocaloric material by latent heat (condensation heat).

The substantially vaporous fluid 3 in the region of the heat exchanger unit 4 condenses on the mechanocaloric material, such that here, a heat transfer takes place by latent heat.

F Opening of the cold-side valve.

As a result of the condensation of the fluid 3, the pressure in the region of the heat exchanger unit 4 decreases. If the pressure in the region of the heat exchanger unit 4 falls below the differential pressure of the cold-side valve, the cold-side 8, which controls the connection to the cold-side reservoir 2, opens.

New, cold fluid 3 flows in from the cold-side reservoir 2, which fluid then, in a further cycle, warms up and can be transported to the hot-side reservoir 1.

Via the fluid return line 6, the fluid 3 is transported from the hot-side reservoir 1 back to the cold-side reservoir 2. To maintain the pressure difference between hot-side reservoir 1 and cold-side reservoir 2, a throttle (not illustrated) is installed into the fluid return line 6, analogously to classic heat pumps based on compressors. This throttle ensures a pressure drop of 4.7 bar in the presence of an adequate fluid flow of >1 g/s for a heat pump power of 2 kW.

The schematic illustration of FIG. 1 will be described in more detail below on the basis of a further alternative specific implementation of an air-conditioning device. For this purpose, as a heat exchanger unit, the mechanocaloric material Nitinol 4 is integrated as hollow rods (cf. FIG. 6a) into a gas-tight (pressure-tight) cylinder 5a.

Here, the hollow rods are situated parallel to one another in a vertical orientation in the gas-tight cylinder 5a. The cylinder 5a can be subjected, by a hydraulic press, to a force $\vec{F}$, which leads to an exertion of pressure on the hollow rods 4, in the present case of up to 750 MPa. As a result, the hollow rods are warmed up, and are correspondingly cooled down again in the event of the force being withdrawn.

Recessed in the gas-tight cylinder 5a are two overpressure valves 7, 8, which separate the hollow rods comprised of mechanocaloric material 4 from the hot-side reservoir 1 and cold-side reservoir 2. In the system comprised of hot-side reservoir 1, cold-side reservoir 2 and cylinder 5a, all residual gases with the exception of the fluid, in the present case ethanol, have been evacuated.

The gas-tight cylinder 5a is connected via the cold-side valve 8 to the cold-side reservoir 2. The cold-side valve 8 is designed as a passive overpressure valve which, in a forward direction, opens already in the presence of small pressure differences of <<1 mbar, whereas said overpressure valve prevents a fluid flow in a reverse direction. In the same way, and overpressure valve 8 is situated in the connection to the hot-side reservoir 1.

As a result of application of an external force to the gas-tight cylinder 5a, the hollow rods 4 warm up, and the fluid that is present in liquid form on said hollow rods evaporates. The overpressure valve 7 in the direction of the hot side opens, and as a result of the evaporation of the fluid, thermal energy is transferred from the hollow rods comprised of mechanocaloric material 4 to the hot-side reservoir 1 by latent heat transfer.

In the event of the external force being withdrawn, the hollow rods 4 cool down. As a result, gaseous fluid condenses on the hollow rods, and the vapor pressure in the gas-tight cylinder 5a decreases. This leads to the opening of the overpressure valve 8 in the direction of the cold-side reservoir 2. In this stage of the process, the temperature in the gas-tight cylinder 2a with the hollow rods comprised of mechanocaloric material 4 is lower than in the cold-side reservoir 2. The fluid 3 in the cold-side reservoir 2 evaporates, whereby the cold-side reservoir cools down.

With every further cycle, thermal energy is exchanged between hollow rods and fluid by latent heat transfer, such that heat transport from the cold side to the hot side occurs. Through cyclic repetition of this process, an ever greater amount of thermal energy is then transported from the cold-side reservoir into the hot-side reservoir. The more quickly this process is repeated, that is to say the higher the cycle frequency is, the greater is the effective level of cooling power.

In the case of 18 hollow rods comprised of Nitinol (Ni55/Ti45) with an outer diameter of 2.4 mm, a wall thickness of 0.5 mm and a length of 10 mm being used, in the case of an exertion of pressure of 700 MPa with a cycle frequency of 0.25 Hz, a temperature difference between hot-side reservoir and cold-side reservoir of approximately 15° is achieved. This corresponds, for example, to a temperature of the hot-side reservoir of approximately 35 degrees (pressure 137 mbar) and a temperature of the cold-side reservoir of approximately 20 degrees (pressure 58 mbar). Use as an air-conditioning system or the like is possible in this temperature range.

The described heat pump can also, with the substantially identical device, be operated as a heat engine. For this purpose, the hot-side reservoir and cold-side reservoir must be interchanged in terms of their functionality. The control of the valves is then performed actively.

Figure 2:
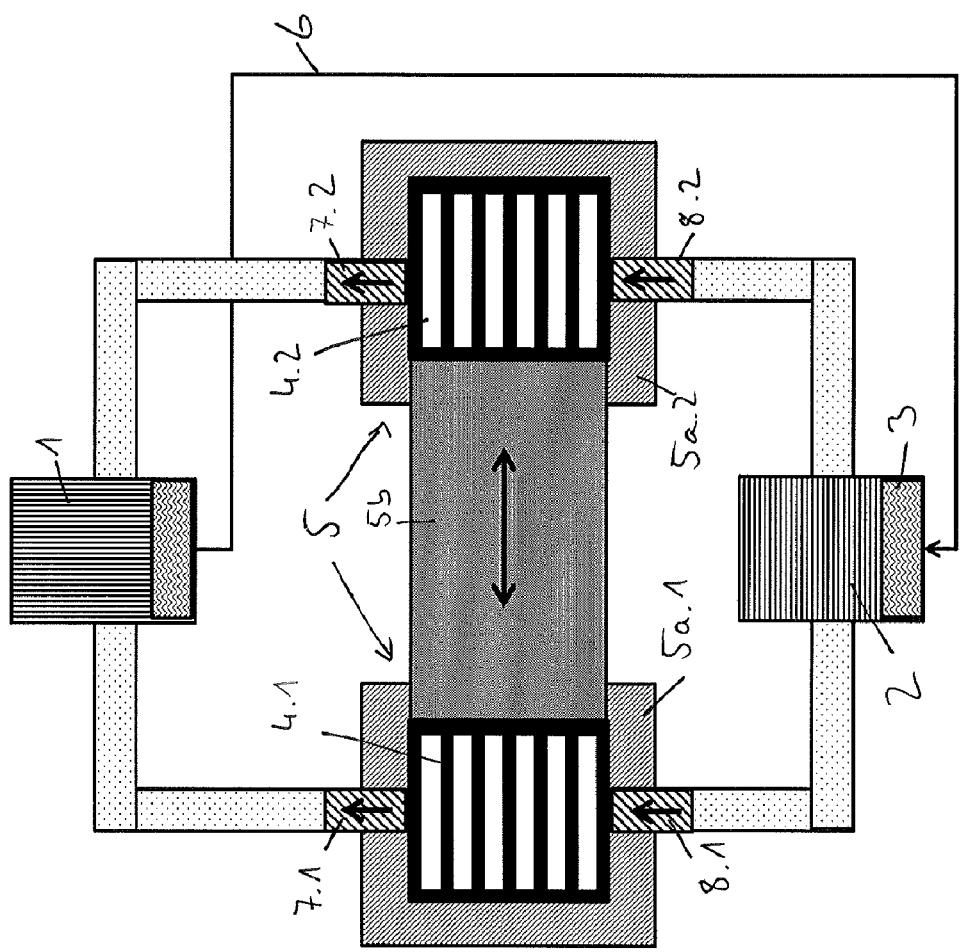
FIG. 2 is a schematic illustration of a second exemplary embodiment of a device according to the invention as a heat pump.

FIG. 2 is a schematic illustration of a heat pump as a second exemplary embodiment of a device according to the invention.

To avoid repetitions, only the differences between the figures will be discussed below.

In the present case, the device is designed as a heat pump and is designed with a hot-side reservoir 1 and a cold-side reservoir 2 for a fluid 3. In the present case, two heat exchanger units 4.1, 4.2 with mechanocaloric material are arranged between hot-side reservoir 1 and cold-side reservoir 2. The heat exchanger units 4.1, 4.2 are arranged in the fluid circuit such that they are flowed through separately by the fluid 3, analogously to a parallel connection of resistances in an electrical circuit.

In the fluid circuit, a hot-side valve 7.1 is arranged between the first heat exchanger unit 4.1 and the hot-side reservoir 1, and a cold-side valve 8.1 is arranged between the first heat exchanger unit 4.1 and the cold-side reservoir 2. Likewise, in the fluid circuit, a hot-side valve 7.2 is arranged between the second heat exchanger unit 4.2 and the hot-side reservoir 1, and a cold-side valve 8.2 is arranged between the second heat exchanger unit 4.2 and the cold-side reservoir 2. In the present case, the hot-side valves 7.1, 7.2 and the cold-side valves 8.1, 8.2 are designed as pressure-controlled valves.

As means for exerting tensile and/or compressive loading on the mechanocaloric material, the heat pump has a piston system 5. The piston system 5 comprises a piston 5*b*, and in the present case is designed as an eccentric for compressing the mechanocaloric material. As counterparts, two cylinders 5*a*.1, 5*a*.2 are provided, in which the mechanocaloric material 4.1, 4.2 is arranged in each case.

For the compression of the mechanocaloric material, the piston is moved back and forth between the cylinders 5*a*.1, 5*a*.2. The two heat exchanger units 4.1, 4.2 with mechanocaloric material are thus compressed alternately. Here, the potential energy contained in the compression of the mechanocaloric material of the first heat exchanger unit 4.1 is used for the compression of the mechanocaloric material of the second heat exchanger unit 4.2, and vice versa.

The eccentric is optionally designed with a ball bearing (instead of the piston 5*b*), the central point of which lies outside the shaft axis of the eccentric shaft (not illustrated). The ball bearing is indirectly operatively connected, in the present case in non-positively locking fashion, to the two heat exchanger units 4.1 and 4.2. In the event of a rotation of the shaft, the ball bearing rotates and compresses the two heat exchanger units 4.1 and 4.2 in each case alternately. Here, the compression takes place within the gas-tight volume of the cylinders 5*a*.1 and 5*a*.2. Here, the ball bearing is situated between the cylinders 5*a*.1 and 5*a*.2 and can act on the heat exchanger units 4.1 and 4.2 through the cylinder, for example via a bellows.

The two heat exchanger units 4.1, 4.2 with mechanocaloric material thus both run through the method described with regard to FIG. 1, but in a time-offset manner.

The opening and closing of the valves 7.1, 7.2, 8.1, 8.2 is controlled by the prevailing pressure conditions, analogously to the situation described with regard to FIG. 1. In this way, active pumps for the fluid 3 can be omitted.

The described heat pump can also, with the substantially identical device, be operated as a heat engine, that is to say with the reverse cyclic process. For this purpose, the hot-side reservoir and cold-side reservoir must be interchanged in terms of their functionality. The control of the valves is then performed actively. As a result of the alternating change in temperature of the two heat exchanger units 4.1, 4.2 with mechanocaloric materials, the heat exchanger units 4.1, 4.2 expand alternately, such that the piston 5*b* is moved back and forth. This movement can be utilized as mechanical work.

Figure 3:
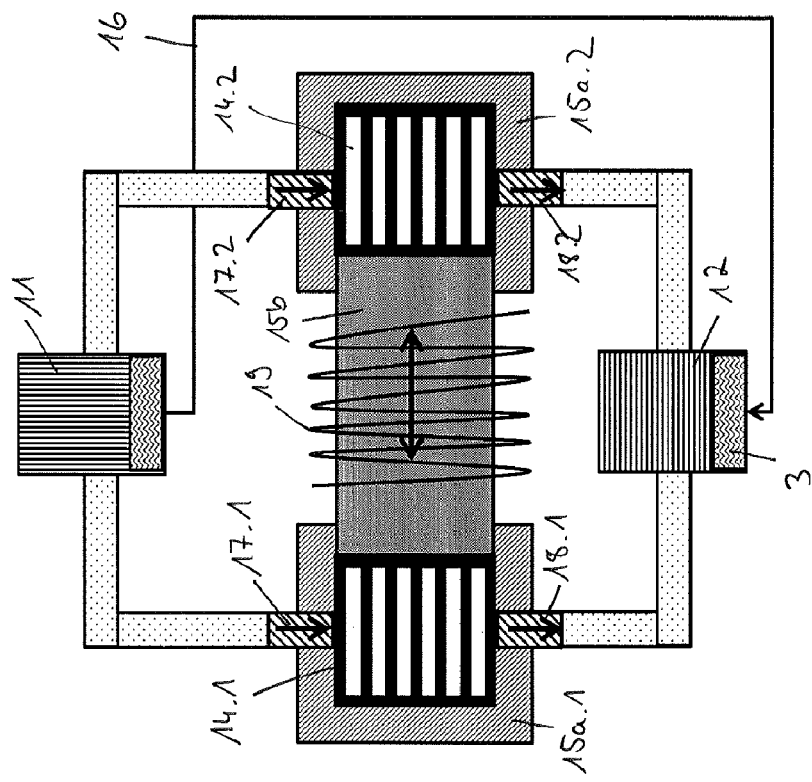
FIG. 3 is a schematic illustration of a third exemplary embodiment of a device according to the invention as a heat engine.

FIG. 3 is a schematic illustration of a third exemplary embodiment of a device according to the invention, which is operable as a heat engine or a heat pump.

In the present case, the device is designed as a heat engine, and is designed with a hot-side reservoir 11 and a cold-side reservoir 12 for a fluid 3. In the present case, to heat exchanger units 14.1, 14.2 with mechanocaloric material are arranged between the hot-side reservoir 11 and cold-side reservoir 12. The heat exchanger units 14.1, 14.2 are arranged in the fluid circuit such that they are flowed through separately by the fluid 3, analogously to a parallel connection of resistances in an electrical circuit. A fluid return line 16 runs between hot-side reservoir 11 and cold-side reservoir 12. This fluid return line is in the present case designed as a tube filled with a wick.

In the fluid circuit, a hot-side valve 17.1 is arranged between the first heat exchanger unit 14.1 and the hot-side reservoir 11, and a cold-side valve 18.1 is arranged between the first heat exchanger unit 14.1 and the cold-side reservoir 12. Likewise, in the fluid circuit, a hot-side valve 17.2 is arranged between the second heat exchanger unit 14.2 and the hot-side reservoir 11, and a cold-side valve 18.2 is arranged between the second heat exchanger unit 14.2 and the cold-side reservoir 12. In the present case, the valves 17.1, 17.2, 18.1, 18.2 are designed as actively controlled valves.

As means for inducing a current from movement, the heat engine has a coil 19 with a magnetizable core 15*b*. The magnetizable core 15*b* of the coil 19 is designed as a piston. As counterparts, two cylinders 15*a*.1, 15*a*.2 are provided, in which the mechanocaloric material 14.1, 14.2 is arranged in each case. The magnetizable core 15*b* of the coil 19 is therefore operatively connected to the mechanocaloric material of the two heat exchanger units 14.1, 14.2. Therefore, a change in temperature of the mechanocaloric material of one of the two heat exchanger units 14.1, 14.2 causes a movement of the core 15*b* in the coil 19 to be generated. The movement of the core 15*b* in the coil 19 causes an electrical current to be induced in the coil.

If the first hot-side valve 17.1 is opened, the fluid 3 in the gaseous phase which is situated in the hot-side reservoir 11 flows into the region of the first heat exchanger unit 14.1 with the mechanocaloric material. There, the fluid 3 condenses on the mechanocaloric material and thus warms up the mechanocaloric material. Owing to the change in temperature, a phase transition in the mechanocaloric material occurs, and the mechanocaloric material expands. Since the mechanocaloric material is operatively connected to the magnetizable core 15*b* in the coil 19, said core is pushed out of the cylinder 15*a*.1.

If, then, the hot-side valve 17.1 is closed and the cold-side valve 18.1 is opened, the pressure in the region of the mechanocaloric material decreases, and the condensed fluid evaporates and, by latent heat transfer, removes evaporation heat from the mechanocaloric material, such that the latter cools. Owing to the change in temperature, the reverse phase transition occurs in the mechanocaloric material, and the mechanocaloric material contracts.

At the same time, the second hot-side valve 17.1 can be opened. The fluid 3 in the gaseous phase situated in the hot-side reservoir 11 thus flows into the region of the second heat exchanger unit 14.2 with the mechanocaloric material. There, the fluid 3 condenses on the mechanocaloric material and thus warms up the mechanocaloric material. Owing to the change in temperature, a phase transition occurs in the mechanocaloric material, and the mechanocaloric material expands. Since the mechanocaloric material is operatively connected to the magnetizable core 15*b* in the coil 19, said core is pushed out of the cylinder 15*a*.2.

These two effects are codirectional, and serve to realize a return movement of the magnetizable core 15*b* in the coil 19.

As a result of the alternating change in temperature of the two heat exchanger units 14.1, 14.2 with mechanocaloric material, the heat exchanger units 14.1, 14.2 expand alternately, such that the magnetizable core 15*b* is moved back and forth in the coil 19. This movement causes an alternating current to be induced.

Via the fluid return line 16, the fluid 3 is transported from the cold-side reservoir 12 back to the hot-side reservoir 11.

The device described with regard to FIG. 3 may likewise be operated as a heat pump, that is to say with the reverse cyclic process. An electrical energization of the coil 19 causes a movement of the magnetizable core 15*b* in the coil to be generated. The movement of the magnetizable core 15*b* in the coil thus causes a compression of the mechanocaloric material, and thus a change in temperature of the two heat exchanger units 14.1, 14.2, such that a change in temperature of the mechanocaloric material is generated.

These changes in temperature may, as described with regard to FIGS. 1 and 2, be transferred in each case to the fluid 3 by latent heat transfer. The heat can then be discharged into the hot-side reservoir by the fluid 3.

Figure 4A:
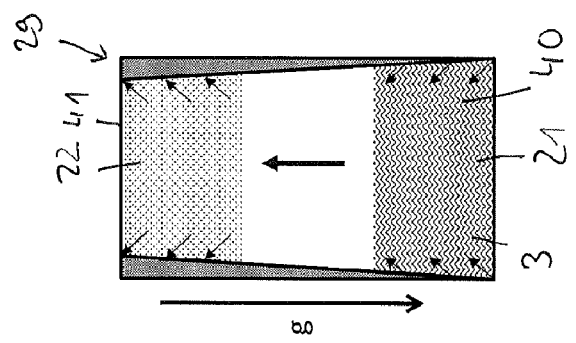
FIGS. 4A-4C show a schematic illustration of the fluid return line.
Figure 4B:
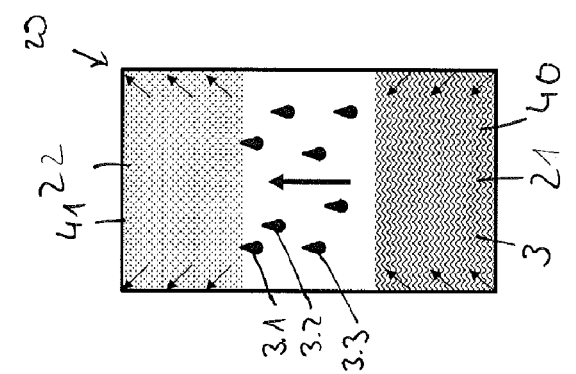
Figure 4C:
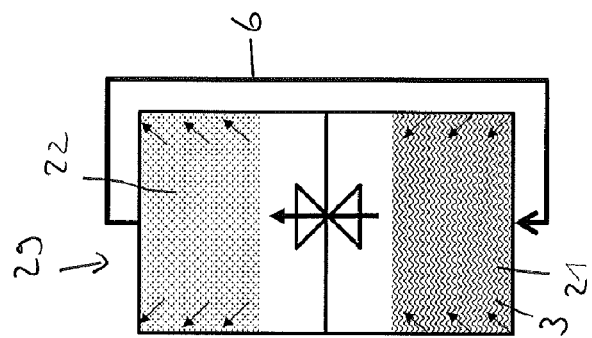

FIGS. 4A-4C show a schematic illustration of three details of exemplary embodiments, in particular for the realization of the unidirectional heat transport by means of latent heat (analogously to a thermal diode) with a corresponding fluid return line.

In the present case, the hot-side reservoir 21, the cold-side reservoir 22 and the mechanocaloric material are arranged in a common, close-off volume 29 for the fluid 3. The cold-side reservoir 22 is arranged in one region of the volume 29, and the hot-side reservoir 21 is arranged in an oppositely situated region of the volume 29. The mechanocaloric material of the heat exchanger unit (not illustrated) is arranged between said regions. This means that only the heat exchanger unit, and no further physical separation, is present between called-side reservoir 22 and hot-side reservoir 21. Here, the fluid 3 can flow unhindered through the mechanocaloric material of the heat exchanger unit. Control of the fluid transport is realized by the boundary conditions such as pressure, temperature and gravitational force.

In all three embodiments, the closed-off volume is designed as a thermal diode, which restricts the heat flow to one direction.

FIG. 4A illustrates a first variant. The return transport of the fluid is realized in the present case by means of gravitational force, illustrated by the arrow g, by virtue of the condensed fluid 3 condensing on a surface of the other reservoir 41 and running back into the origin reservoir 40 under the action of the gravitational force g.

A return transport of the condensed fluid 3 is thus realized in order to prevent the origin reservoir 40 of the fluid 3 from drying out. This process is however rather slow and is not independent of position.

FIG. 4B illustrates a second variant. In the present case, the closed-off volume 29 has a superhydrophilic coating in the region of the origin reservoir 40 and has a superhydrophobic coating in the region of the other reservoir 41. The device is thus designed analogously to a "jumping-drop thermal diode", as described in Boreyko et al., Applied Physics Letter 99.

If the fluid in the closed-off volume evaporates and condenses on the superhydrophobic coating in the region of the other reservoir 41, the condensed droplets, denoted by way of example by 3.1, 3.2 and 3.3, of the fluid 3 are correspondingly repelled by the coating, such that they "jump back" into the superhydrophilic region of the origin reservoir 40. In the present case, the origin reservoir 40 is the hot-side reservoir 21, and the other reservoir 41 The jumping-drop thermal diode functions independently of the position of the diode in space. There is additionally the advantage that the return transport of the condensed fluid 3 can take place quickly.

FIG. 4C schematically illustrates the exemplary embodiments, described with regard to FIGS. 1 to 3, with valve control and external fluid return line 6.

Figure 5:
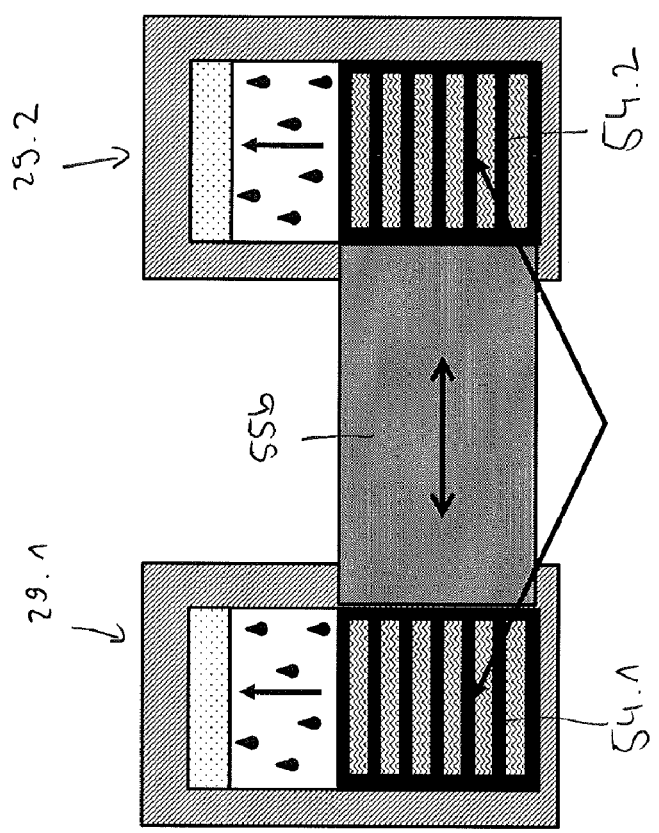
FIG. 5 is a schematic illustration of the embodiment of FIG. 4B as a jumping-drop thermal diode for unidirectional heat transport.

FIG. 5 is a schematic illustration of the variance described in FIG. 4B as a jumping-drop thermal diode for the realization of the unidirectional heat transport by latent heat and the fluid return line. Additionally illustrated is the mechanocaloric material of two heat exchanger units 54.1, 54.2 in the respective closed-off volume 29.1, 29.2. Provided between the two heat exchanger units 54.1, 54.2 is a piston 55*b*, which is in each case operatively connected to the mechanocaloric material of the two heat exchanger units 54.1, 54.2.

For the compression of the mechanocaloric material, the piston 55*b* is moved back and forth, as indicated by the double arrow. The two heat exchanger units 54.1, 54.2 with mechanocaloric material are thus compressed alternately.

The two heat exchanger units 54.1, 54.2 with mechanocaloric material thus both run through the method described with regard to FIGS. 1 and 2. The heat transport and the return of the fluid take place as described in FIG. 4*b*.

Figure 6C:
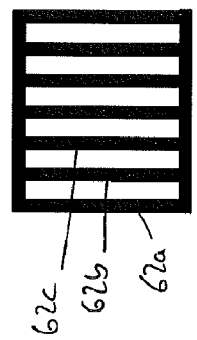
FIGS. 6A-6C show a schematic illustration of the mechanocaloric material.
Figure 6B:
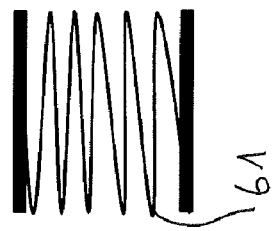
Figure 6A:
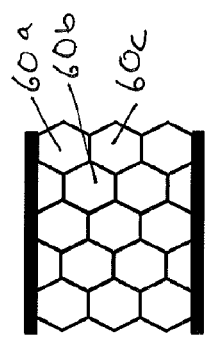

FIGS. 6A-6C show a schematic illustration of various embodiments of the mechanocaloric material.

FIG. 6A shows the mechanocaloric material with a pin structure. In the case of the embodiment as a pin structure, in the present case with multiple parallel pins, denoted by way of example by 62*a*, 62*b* and 62*c*, there is the advantage that a stable structure with a large surface area for the heat transfer can be formed in a simple manner.

FIG. 6B shows the mechanocaloric material as a spring 61. The spring structure permits a greater travel owing to the compression of the mechanocaloric material by a piston system. Here, the spring is compressed and stored the potential energy from the compression. Here, in a particularly efficient manner, the potential energy stored in the mechanocaloric material can be returned in order that it can be utilized for a compression of a further heat exchanger unit with mechanocaloric material.

FIG. 6C shows the mechanocaloric material with a honeycomb structure. The individual honeycombs, denoted by way of example by 60a, 60b, 60c, of the honeycomb structure are in the present case of regular hexagonal form. The acting forces of the mechanical stress field during the compressive or tensile loading are distributed homogeneously in the honeycomb structure. This ensures a uniform force distribution and thus a long lifetime of the mechanocaloric material. Owing to the uniform force distribution, it is possible for thin structures, in particular intermediate walls, to be formed between the individual honeycombs. In this way, good heat transport in the material is ensured.

The invention claimed is:

1. A method for operating cyclic-process-based systems having a hot-side reservoir (1, 11, 21) and a cold-side reservoir (2, 12, 22) for a fluid (3) and at least one heat exchanger unit (4) with a mechanocaloric material, the cyclic-process-based system being a heat pump having at least two heat exchanger units (14.1, 14.2), including the at least one heat exchanger unit, the heat exchanger units having the mechanocaloric material, the method comprising: arranging the mechanocaloric material of the heat exchanger unit (4) to be operatively connected to the fluid (3) in a gas-tight fluid circuit, such that a heat transfer takes place between mechanocaloric material and fluid (3), transferring heat between mechanocaloric material and the fluid (3) substantially by latent heat transfer via evaporation heat and condensation heat of the fluid (3), and alternately opening and closing a hot-side valve (7, 17) and a cold-side valve (8, 18) with respect to one another.

2. The method as claimed in claim 1, further comprising: generating a change in shape of the mechanocaloric material by a mechanical stress in the mechanocaloric material, and generating a change in temperature of the mechanocaloric material by at least one of a tensile or compressive loading of the mechanocaloric material.

3. The method as claimed in claim 1, wherein the heat exchanger units having the mechanocaloric material, and using potential energy contained in a compression of the mechanocaloric material of a first one of the heat exchanger units (14.1) from elastic deformation of the mechanocaloric material for compression of the mechanocaloric material of a second one of the heat exchanger units (14.2).

4. The method as claimed in claim 1, wherein the alternately opening and closing the hot-side valve (7, 17) and the cold-side valve (8, 18) with respect to one another is carried out with an alternation frequency higher than 10 Hz.

5. The method as claimed in claim 1, further comprising at least one of forming the mechanocaloric material as a porous material, with a honeycomb structure, as a pin structure or as a spring, with a structuring or a coating.

6. The method as claimed in claim 1, further comprising providing a fluid circuit for the fluid (8), including a fluid return line (6, 16), and the fluid circuit includes the hot-side reservoir (1, 11, 21), the cold-side reservoir (2, 12, 22), the hot-side valve (7, 17), the cold-side valve (8, 18), the mechanocaloric material, and the fluid return line (6, 16) and is a pressure-tight system, and configuring the pressure-tight system such that the heat transfer from the fluid (8) to the mechanocaloric material takes place by latent heat.

7. The method as claimed in claim 6, further comprising removing substantially all foreign gases other than the fluid (3) from the pressure-tight system.

8. The method as claimed in claim 6, wherein the hot-side valve (7, 17) is arranged in the fluid circuit between the hot-side reservoir (1, 11, 21) and the mechanocaloric material, and the method further comprising heating of the mechanocaloric material causing the hot-side valve (7, 17) to be opened, and the cold-side valve (8, 18) is arranged in the fluid circuit between the cold-side reservoir (2, 12, 22) and the mechanocaloric material, and the method further comprising cooling of the mechanocaloric material causing causes the cold-side valve (8, 18) to be opened.

9. The method of claim 8, further comprising arranging the cold-side reservoir (2, 12, 22), the hot-side reservoir (1, 11, 21), and the mechanocaloric material in a closed-off volume (29) in which heat transport takes place by convection of the fluid (3) that is evaporated, and return transport of the fluid (3) that is evaporated takes place.

10. The method of claim 9, further comprising providing the closed-off volume (29) with at least one of a fluid-phobic coating or structuring in a region of the hot-side reservoir (2) or at least one of a fluid-philic coating or structuring in a region of the cold-side reservoir (2), or both.

11. The method of claim 9, further comprising providing the closed-off volume (29) with at least one of a hydrophilic coating or structuring in a region of the hot-side reservoir (2) or at least one of a hydrophobic coating or structuring in a region of the cold-side reservoir (2), or both.

12. The method of claim 9, further comprising providing the closed-off volume (29) with at least one of an oleophilic coating or structuring in a region of the hot-side reservoir (2) or at least one of an oleophobic coating or structuring in a region of the cold-side reservoir (2), or both.

13. The method of claim 1, further comprising providing a heat pump and a piston system (5, 15, 19) as the mechanical stress generator that generates a mechanical stress (5, 15, 19) for at least one of tensile or compressive loading.

14. The method of claim 1, further comprising providing a heat engine having the at least two heat exchanger units (14.1, 14.2) with the mechanocaloric material.

15. The method of claim 1, further comprising providing a heat engine having the at least two heat exchanger units (14.1, 14.2) with the mechanocaloric material.

16. The method of claim 1, wherein the alternately opening and closing of the hot-side valve (7, 17) and the cold-side valve (8, 18) with respect to one another is with an alternation frequency of between 0.1 Hz and 10 kHz.

* * * * *